(12) United States Patent
Sasaki et al.

(10) Patent No.: US 7,302,085 B2
(45) Date of Patent: Nov. 27, 2007

(54) VEHICLE IDENTIFICATION METHOD AND DEVICE

(75) Inventors: Nobumasa Sasaki, Kawasaki (JP); Hiroaki Natori, Kawasaki (JP); Tamotsu Amamoto, Yokohama (JP); Osamu Ikeda, Kawasaki (JP); Yutaka Maruta, Kawasaki (JP); Kunihiro Ikeda, Kawasaki (JP); Shinji Hidaka, Kawasaki (JP); Masashi Murakumo, Yokohama (JP); Hiroyuki Nakashima, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 103 days.

(21) Appl. No.: 11/108,084

(22) Filed: Apr. 18, 2005

(65) Prior Publication Data

US 2005/0179776 A1    Aug. 18, 2005

Related U.S. Application Data

(63) Continuation of application No. PCT/JP03/03173, filed on Mar. 17, 2003.

(51) Int. Cl.
G06K 9/00 (2006.01)

(52) U.S. Cl. ............... 382/105; 348/135; 348/148; 362/236

(58) Field of Classification Search ............... 382/100, 382/104, 105; 348/110, 135, 148, 149, 143; 340/907; 362/18, 227, 236
See application file for complete search history.

(56) References Cited

U.S. PATENT DOCUMENTS

| 3,988,715 | A | * | 10/1976 | Mullan et al. ............... 382/228 |
| 4,837,842 | A | * | 6/1989 | Holt ............................ 382/204 |
| 5,067,164 | A | * | 11/1991 | Denker et al. ............... 382/158 |
| 5,220,621 | A | * | 6/1993 | Saitoh ......................... 382/200 |
| 5,519,786 | A | * | 5/1996 | Courtney et al. ............ 382/159 |
| 5,805,747 | A | * | 9/1998 | Bradford ..................... 382/310 |
| 6,711,280 | B2 | * | 3/2004 | Stafsudd et al. ............. 382/106 |

(Continued)

FOREIGN PATENT DOCUMENTS

JP    5-161078    6/1993

(Continued)

*Primary Examiner*—Vikkram Bali
*Assistant Examiner*—Anand Bhatnagar
(74) *Attorney, Agent, or Firm*—Staas & Halsey LLP (57) ABSTRACT

In order to improve an identification accuracy of a backlit number plate in a vehicle identification method and device which recognize a vehicle number from a number plate of a vehicle whose image is taken, an image frame of a vehicle is taken by an interlace method, irradiation is performed in an odd field and an even field composing the image frame with light of light quantities different from each other, images of the odd field and the even field are captured, and character recognition processing, only when character recognition processing of a number plate area extracted from an image of one field has ended in failure, of a number plate area extracted from an image of the other field is performed. Also, character recognition processings of number plate areas extracted from the images of the odd field and the even field respectively are performed in parallel, and a result of character recognition processing, only when character recognition processing of a number plate area extracted from an image of one field has ended in failure, of a number plate area extracted from an image of the other field, is adopted as an identification result of the vehicle.

12 Claims, 7 Drawing Sheets

U.S. PATENT DOCUMENTS 7,103,199 B2 * 9/2006 Watanabe et al. ........... 382/105

FOREIGN PATENT DOCUMENTS

| JP | 7-121793 | 5/1995 |
| JP | 7-146916 | 6/1995 |
| JP | 9-102930 | 4/1997 |
| JP | 2001-307017 | 11/2001 |
| JP | 2002-133579 | 5/2002 |
| JP | 2004/084121 A1 * | 9/2004 |

* cited by examiner

VEHICLE IDENTIFICATION METHOD AND DEVICE

This application is a continuing application, filed under 35 U.S.C. §111(a), of International Application PCT/JP03/03173, filed Mar. 17, 2003.

BACKGROUND OF THE INVENTION

1. Field of the Invention

The present invention relates to a vehicle identification method and device, and in particular to a vehicle identification method and device which recognize a vehicle number from a number plate of a vehicle whose image is taken.

2. Description of the Related Art

A vehicle identification device which recognizes a vehicle number by taking an image of a number plate of a vehicle and performing image processing has been conventionally known. The vehicle identification device has been applied to a vehicle management system for preventing e.g. an unauthorized pass of ETC in an expressway and an unauthorized usage of a parking lot.

In the vehicle identification device, a video type camera performing an interlaced scanning such as an NTSC system is generally used. In the interlaced scanning, a single frame of an image is composed of two fields, i.e. an odd field and an even field. However, since there is a capturing time lag (1/60 sec.) in the fields, a vehicle which is an identification object becomes blurred in an image of a single frame.

Therefore, in the prior art vehicle identification device, character recognition processing of a number plate has been performed by using an image of only one field composing a single frame and an image of the other field has not been used.

Also, in the prior art vehicle identification device, near-infrared rays or the like have been used for irradiation (hereinafter, referred to as LED irradiation) at the time of a light quantity shortage such as in the nighttime, in a rainy day, or in a cloudy weather, and then images of vehicles have been taken.

An arrangement and an operation of such a prior art vehicle identification device will now be described referring to FIGS. 6 and 7.

Figure 6:
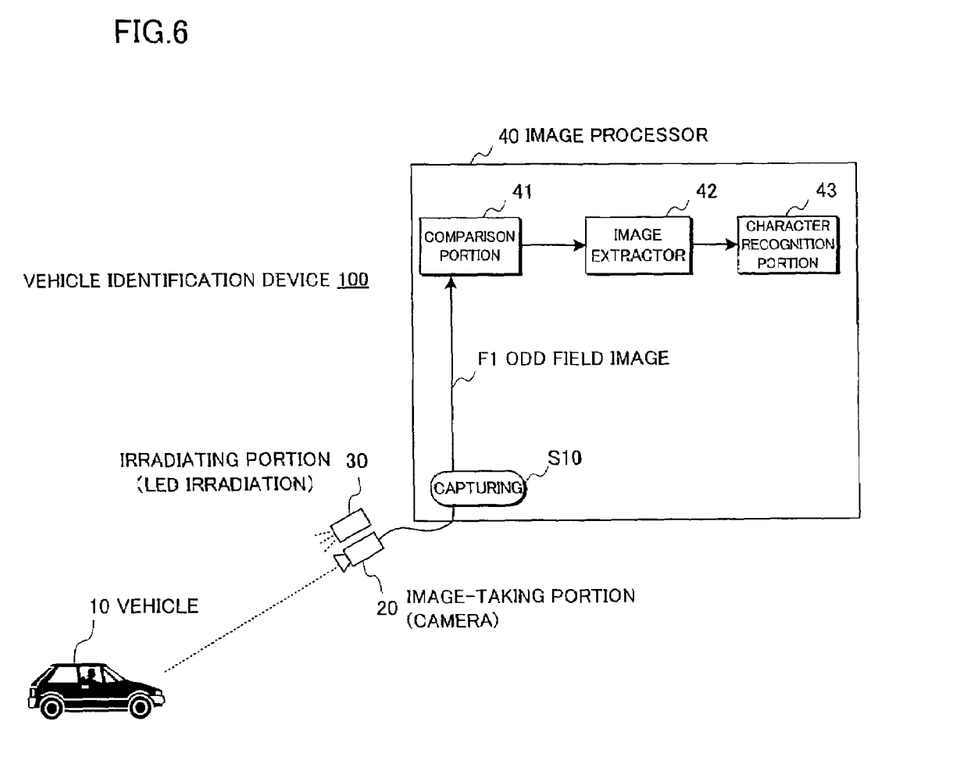
FIG. 6 is a block diagram showing an arrangement of a prior art vehicle identification device.

A vehicle identification device 100 shown in FIG. 6 is composed of an image-taking portion 20 which is a camera taking images of a vehicle 10, an irradiating portion 30 which performs the LED irradiation at the time of the light quantity shortage and an image processor 40 which captures an image from the image-taking portion 20 to perform the image processing.

The image processor 40 is composed of a comparison portion 41 which compares an image captured from the image-taking portion 20 at step S10 with an image captured last time to confirm whether or not a vehicle which is a recognition object exists, an image extractor 42 which extracts a number plate area when the recognition object vehicle exists and a character recognition portion 43 which recognizes a vehicle number from the number plate area extracted.

Figure 7:
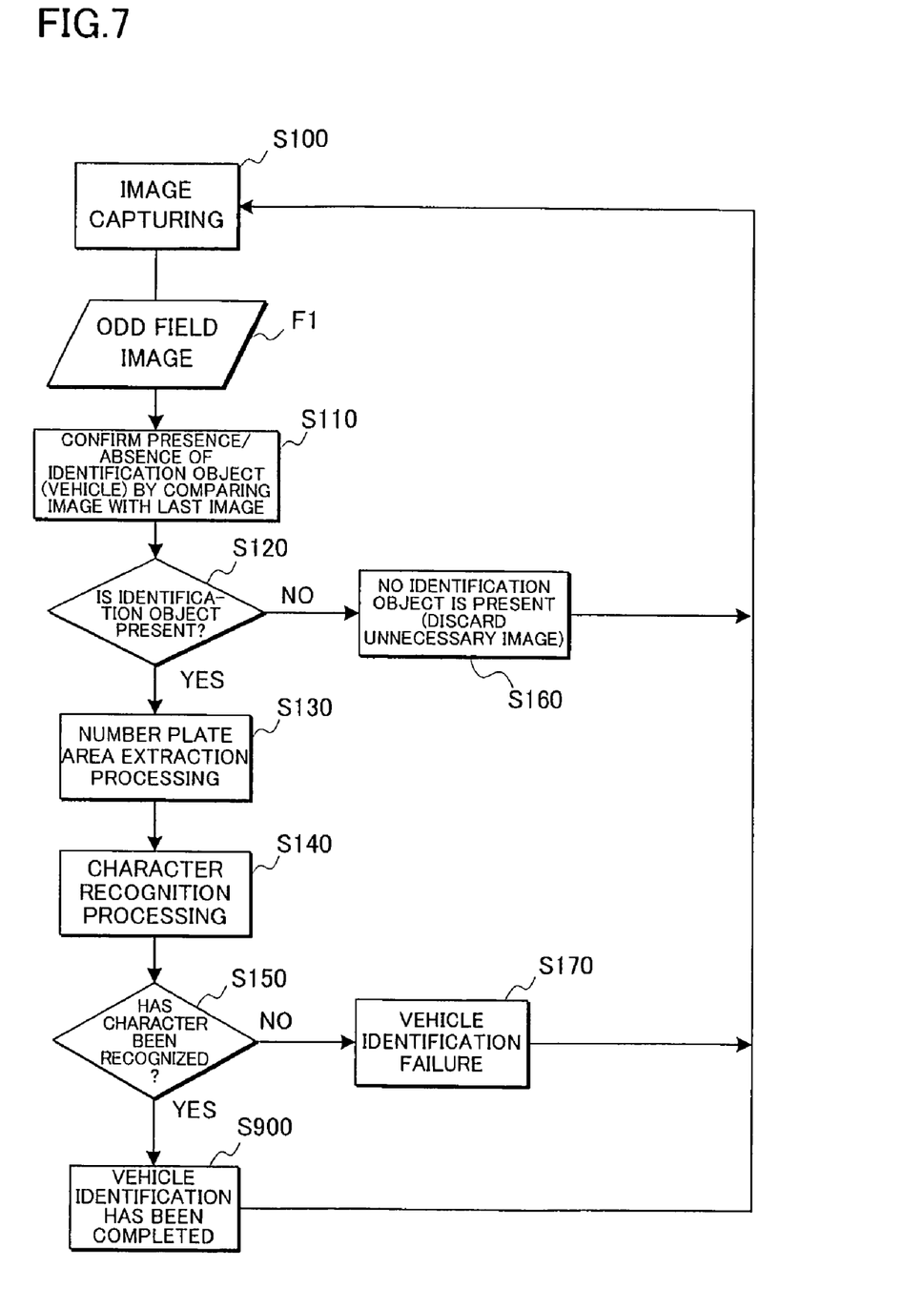
FIG. 7 is a flowchart showing a vehicle identification processing procedure of a prior art vehicle identification device.

FIG. 7 shows an operation flow of the image processing by the image processor 40 in FIG. 6. At step S100 corresponding to step S10 of FIG. 6, an image is captured. It is supposed that an odd field image F1 is captured and processed. The processing procedure will now be described.

At step S110, the comparison portion 41 compares an image captured last time with an image captured this time, and confirms whether or not the identification object vehicle exists. Namely, in the presence of an identification object at step S120, the image extractor 42 performs number plate area extraction processing (at step S130), and the character recognition portion 43 performs the character recognition processing for the number plate area extracted (at step S140).

Based on the result of the character recognition processing at step S140, whether or not a character has been recognized is determined at step S150. When it has been recognized, a vehicle identification is completed (at step S900).

When it is determined that there is no identification object at step S120, an unnecessary image is discarded because of absence of an identification object at step S160. Also, when it is determined that a character can not be recognized at step S150, the process returns to the image capturing processing of step S100, regarding it as the vehicle identification failure (at step S170).

It is to be noted that at step S100 of FIG. 7, the processing is started at predetermined intervals. In case of the interlaced scanning of the NTSC system, the processing is started at intervals of 1/30 sec.

In the above-mentioned prior art vehicle identification device, the number plate area is extracted from the taken image, and a character part and a background part are specified by binaryization, thereby performing the character recognition.

As such a prior art vehicle identification device, a device which reliably detects a driving vehicle from an image with a comparative low resolution taken by a single camera and which reads a number plate with a high accuracy from the detected image is provided (see e.g. patent document 1).

(Patent Document 1)
Japanese Patent Application Laid-open No.2001-273461 (Abstract, FIG. 1)

As for a number plate presently used, there are a normal one and a backlit one. In the prior art vehicle identification device, as mentioned above, such a difference of kinds of number plates is not taken into account when the irradiating portion 30 performs the LED irradiation at the light quantity shortage.

Figure 8A:
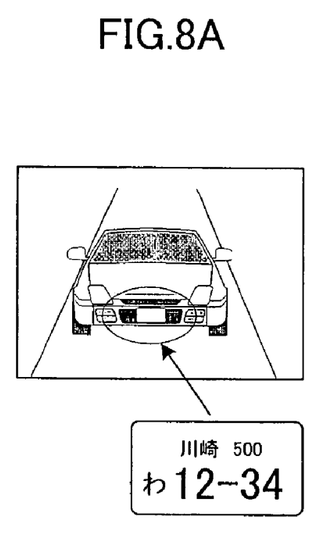
FIGS. 8A and 8B are diagrams for illustrating a difference between images of a normal number plate and a backlit number plate upon LED irradiation.
Figure 8B:
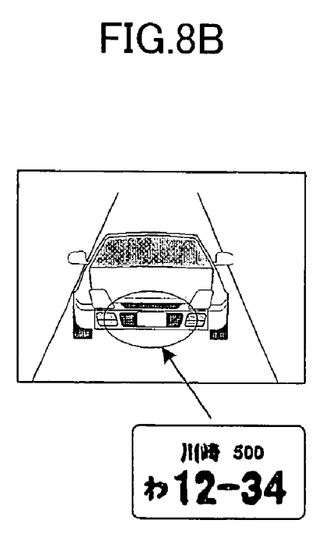

For example, FIG. 8A showing an image in a case where a number plate whose image is taken by the image-taking portion 20 while the irradiating portion 30 performs the LED irradiation is a normal number plate is compared with FIG. 8B showing an image in a case where a number plate is a backlit number plate. In the latter case, a light quantity emitted by the backlit number plate itself is added to the light quantity by the LED irradiation. Therefore, it is recognized that when the image taken in an excessive light quantity is binarized, the outline of the character of the number plate is blurred.

In this case, the problem occurs that a character recognition for the backlit number plate can not be performed.

SUMMARY OF THE INVENTION

It is an accordingly an object of the present invention to provide a vehicle identification method and device which recognize a vehicle number from a number plate of a vehicle whose image is taken, wherein an identification accuracy of a backlit number plate is improved.

In order to achieve the above-mentioned object, a vehicle identification method according to the present invention comprises the steps of: taking an image frame of a vehicle by an interlace method; performing irradiation in an odd field and an even field composing the image frame with light of light quantities different from each other; capturing images of the odd field and the even field; and performing character recognition processing, only when character recognition processing of a number plate area extracted from an image of one field has ended in failure, of a number plate area extracted from an image of the other field.

Namely, an image frame of a vehicle is taken by an interlace method, and irradiation is performed in an odd field and an even field composing the image frame with light of light quantities different from each other.

Thus, images of the odd field and the even field in which the irradiation is performed with light of light quantities different from each other are captured, and character recognition processing of a number plate area extracted from an image of one field (e.g. odd field) is performed in the same way as the conventional technology.

Only when the above-mentioned character recognition processing ends in failure, the character recognition processing of a number plate area extracted from an image of the other field (e.g. even field) is performed.

Accordingly, if the light quantity of light with which the irradiation is performed in e.g. the even field is set less than that of the odd field, there is a high possibility that a character can be recognized in the image of even field where the light quantity is reduced, even if the character recognition ends in failure due to an excessive light quantity in the odd field image in case of a backlit number plate. Thus, it becomes possible to improve an identification accuracy of a backlit number plate.

Also, in the above-mentioned vehicle identification method may comprise the steps of: taking an image frame of a vehicle by an interlace method; performing irradiation in an odd field and an even field composing the image frame with light of light quantities different from each other; capturing images of the odd field and the even field; performing character recognition processings of number plate areas extracted from the images of the odd field and the even field respectively in parallel; and adopting a result of character recognition processing, only when character recognition processing of a number plate area extracted from an image of one field has ended in failure, of a number plate area extracted from an image of the other field, as an identification result of the vehicle.

Namely, the character recognition processings of the number plate areas extracted from the images, captured in the same way as the above, of the odd field and the even field in which the irradiation is performed with the light of the light quantities different from each other, are performed in parallel.

If the character recognition processings are performed in parallel in this way, two recognition results are always can be obtained for a single vehicle. However, since both are not always coincident with each other, only when the character recognition processing of the number plate area extracted from an image of one field (e.g. odd field) ends in failure, the result of the character recognition processing of the number plate area extracted from the image of the other field (e.g. even field) is adopted as an identification result of the vehicle.

Accordingly, if the light quantity of light with which the irradiation is performed in e.g. the even field is set less than that of the odd field, there is a high possibility that a character can be recognized in the image of even field where the light quantity is reduced, even if the character recognition ends in failure due to an excessive light quantity in the odd field image in case of a backlit number plate. Thus, it becomes possible to improve an identification accuracy of a backlit number plate.

Furthermore, since the character recognition processings of the number plate areas extracted from images of the odd field and the even field are respectively performed in parallel, the processing speed is high.

Also, at the above-mentioned step of performing the irradiation, the light quantity of the irradiation for either the odd field or the even field may be null.

Also, at the above-mentioned step of performing the irradiation, the irradiation may be performed in the odd field and the even field not with the light of the light quantities different from each other but with light of a same light quantity, and at the step of capturing images, the images of the odd field and the even field may be captured at shutter speeds different from each other.

Namely, in order to capture the images of the odd field and the even field whose light quantities are different from each other, the light quantities with which the irradiation is performed in the odd field and the even field are made equal and the images of the odd field and the even field are captured at shutter speeds different from each other.

Thus, if the shutter speed at the time of capturing the image of e.g. the even field is set faster than the shutter speed at the time of capturing the image of the odd field, there is a high possibility that a character can be recognized in the image of even field where the light quantity is reduced, even if the character recognition ends in failure due to an excessive light quantity in the odd field image in case of a backlit number plate. Thus, it becomes possible to improve an identification accuracy of a backlit number plate.

Also, a vehicle identification device realizing the above-mentioned vehicle identification method comprises: an image-taking portion for taking an image frame of a vehicle by an interlace method; an irradiating portion for performing irradiation in an odd field and an even field composing the image frame with light of light quantities different from each other; and an image processor for capturing images of the odd field and the even field and for performing character recognition processing, only when character recognition processing of a number plate area extracted from an image of one field has ended in failure, of a number plate area extracted from an image of the other field.

Also, the above-mentioned vehicle identification device may comprise: an image-taking portion for taking an image frame of a vehicle by an interlace method; an irradiating portion for performing irradiation in an odd field and an even field composing the image frame with light of light quantities different from each other; and an image processor for capturing images of the odd field and the even field, for performing character recognition processings of number plate areas extracted from the images of the odd field and the even field respectively in parallel and for adopting a result of character recognition processing, only when character recognition processing of a number plate area extracted from an image of one field has ended in failure, of a number plate area extracted from an image of the other field, as an identification result of the vehicle.

Also, the above-mentioned irradiating portion may make the light quantity of the irradiation for either the odd field or the even field null.

Also, the above-mentioned irradiating portion may perform the irradiation in the odd field and the even field not with the light of the light quantities different from each other but with light of a same light quantity, and the image processor may capture the images of the odd field and the even field at shutter speeds different from each other.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which.

DESCRIPTION OF THE EMBODIMENTS

Embodiment (1)

Figure 1:
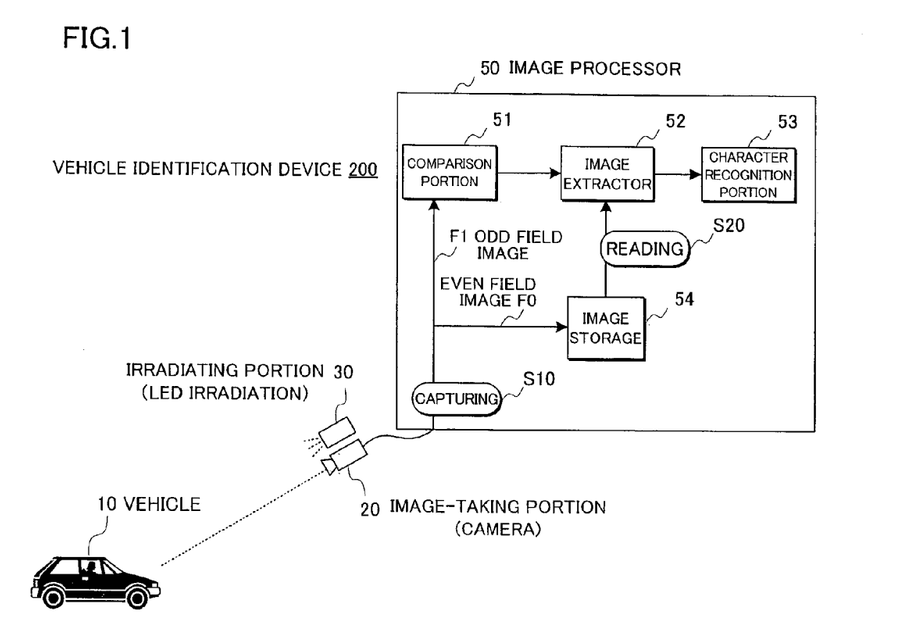
FIG. 1 is a block diagram showing an embodiment (1) of a vehicle identification method and device according to the present invention.

FIG. 1 shows an embodiment (1) of the present invention. A vehicle identification device 200 in FIG. 1 is composed of an image-taking portion 20 which takes an image of a vehicle 10, an irradiating portion 30 which performs an LED irradiation and an image processor 50. The image processor 50, in the same way as the image processor 40 of the prior art vehicle identification device 100 shown in FIG. 6, has a comparison portion 51, an image extractor 52 and a character recognition portion 53. The image processor 50 further has an image storage 54.

In this embodiment (1), the image processor 50 captures both of an odd field image F1 and an even field image F0 from the image-taking portion 20 at step S10 of FIG. 1.

Timings of the LED irradiation by the irradiating portion 30 and of image capturing by the image processor 50 at this time will now be described referring to FIGS. 2A-2D.

Figure 2A:
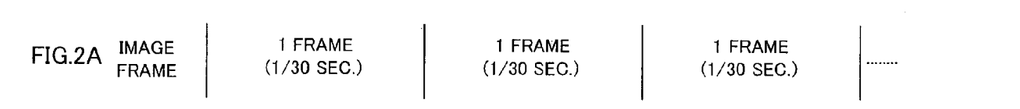
FIGS. 2A-2D are diagrams for illustrating an LED irradiation timing and an image capturing timing of an embodiment (1)
Figure 2B:
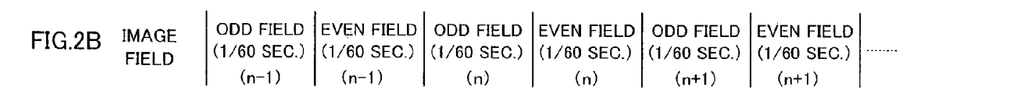

FIG. 2A shows image frames of ⅟30 sec. taken by the image-taking portion 20. FIG. 2B shows that each image frame of FIG. 2A is composed of an odd field of ⅟60 sec. and an even field of ⅟60 sec.

Figure 2C:
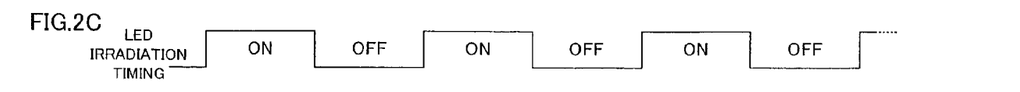

FIG. 2C shows an LED irradiation timing by the irradiating portion 30. In this embodiment (1), the LED irradiation is made "ON" for the odd field and it is made "OFF" for the even field.

Figure 2D:
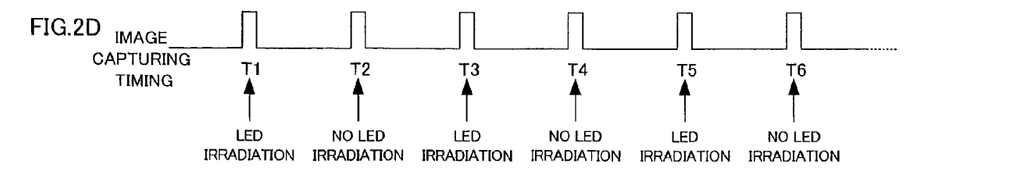

Also, FIG. 2D shows an image capturing timing by the image processor 50. As shown in FIG. 2D, the LED irradiation is performed to the images of the odd field captured with the timings of T1, T3 and T5 among the images captured at intervals of ⅟60 sec. with the timings of T1-T6, and the LED irradiation is not performed to the images of the even field captured with the timings of T2, T4 and T6.

Accordingly, in the odd field image and the even field image composing the same frame, the light quantities are different from each other.

As mentioned above, the odd field image F1 captured by the image processor 50 is transferred to the comparison portion 51. The even field image F0 is stored in the image storage 54. This even field image F0 is read by the image extractor 52 at step S20 as required.

Figure 3:
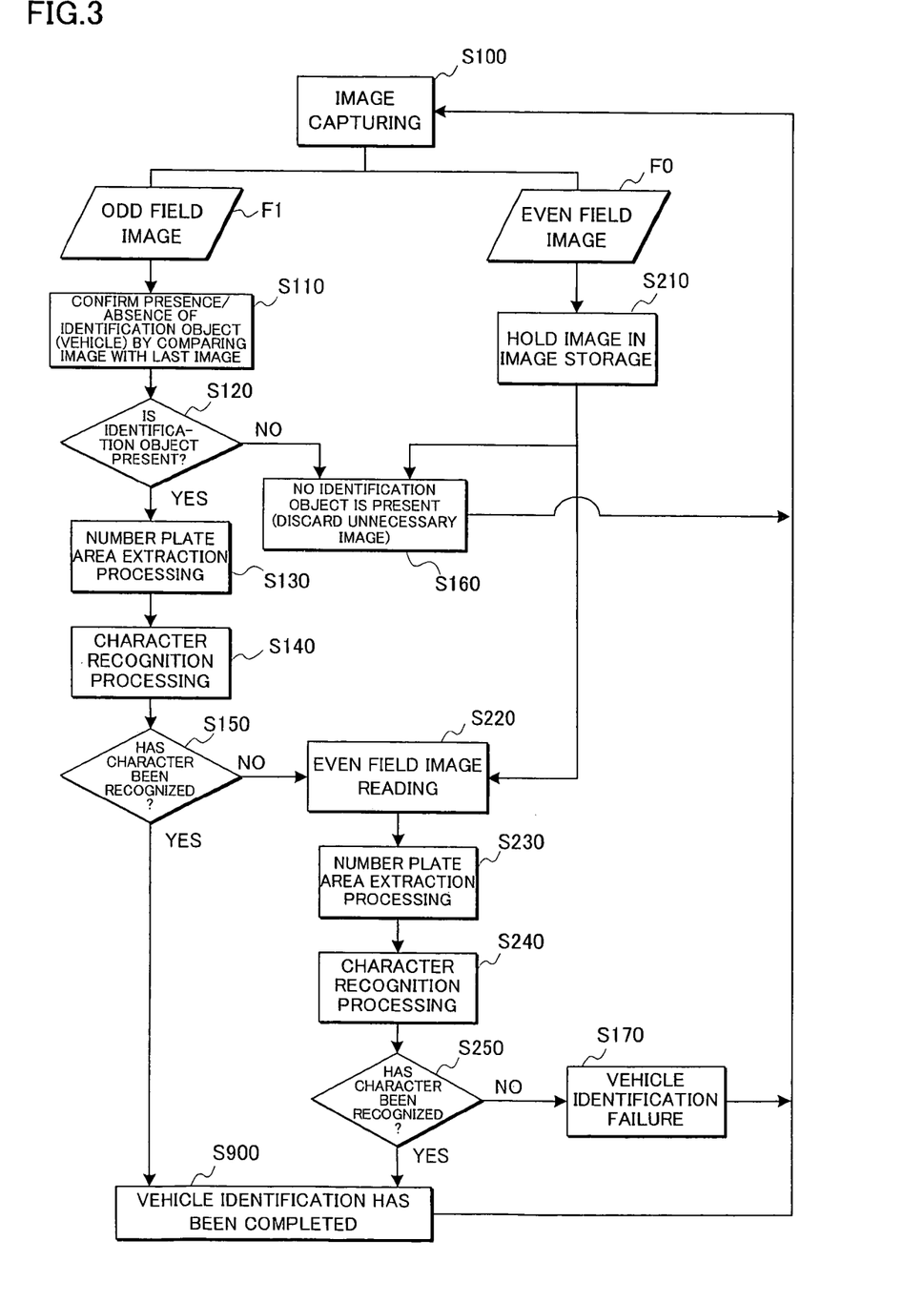
FIG. 3 is a flowchart showing a vehicle identification processing procedure in an embodiment (1)

FIG. 3 shows an image processing procedure of the odd field image F1 and the even field image F0 captured from the image-taking portion 20.

At step S100 of FIG. 3 corresponding to step S10 of FIG. 1, an image is captured. When the captured image is the odd field image F1, the comparison portion 51 compares the image (e.g. "n−1"th odd field image captured with the timing of T1 of FIG. 2D) captured last time with the image captured this time (e.g. "n"th odd field image captured with the timing of T3 of FIG. 2D) at step S110 and confirms whether or not the identification object vehicle exists.

Namely, in the presence of the identification object at step S120, the image extractor 52 performs number plate area extraction processing (at step S130) and the character recognition portion 53 performs the character recognition processing of the extracted number plate area (at step S140).

Based on the result of the character recognition processing at step S140, whether or not the character has been recognized is determined at step S150. When it has been recognized, the vehicle identification is completed (at step S900).

On the other hand, when the image captured at step S100 is the even field image F0, the image storage 54 holds the even field image F0 at step S210.

Accordingly, when it is determined that there is no identification object at step S120 and when unnecessary images are discarded because of absence of an identification object at step S160, unnecessary images not only for the odd field image F1 but also for the even field image F0 are discarded.

Also, when it is determined that the character can not be recognized at step S150, the image extractor 52 reads the even field image F0 from the image storage 54 at step S220 corresponding to step S20 of FIG. 1, performs the number plate area extraction processing (at step S230), and the character recognition portion 53 performs the character recognition processing in the extracted number plate area (at step S240).

Then, whether or not the character has been recognized is determined at step S250, and when it has been recognized, the vehicle identification is completed (at step S900).

When the character has not been recognized at step S250, the process returns to the image capturing processing of step S100, regarding it as the vehicle identification failure (at step S170).

The processing of step S100 in FIG. 3 is started at intervals of ⅟60 sec. since the image capturing timing is for both of the odd field and the even field. This corresponds to the timings T1-T6 of FIG. 2D.

It is to be noted that steps S110-S170 shown in FIG. 3 are the same as steps S110-S170 in the processing flow of the prior art vehicle identification device shown in FIG. 7.

Embodiment (2)

Figure 4:
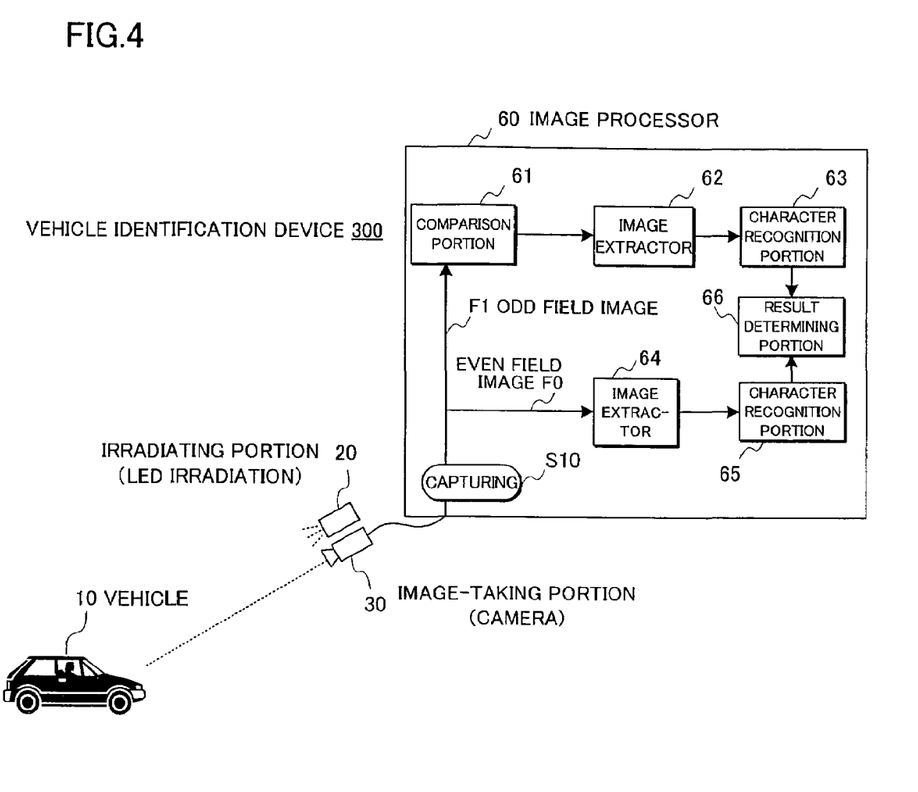
FIG. 4 is a block diagram showing an embodiment (2) of a vehicle identification method and device according to the present invention.

FIG. 4 shows an embodiment (2) of the present invention. A vehicle identification device 300 shown in FIG. 4 is composed of the image-taking portion 20 which takes the image of the vehicle 10, the irradiating portion 30 which performs the LED irradiation and an image processor 60.

The image processor 60 has, in the same way as the image processor 50 in the embodiment (1) shown in FIG. 1, a comparison portion 61 which processes the odd field image F1, an image extractor 62 and a character recognition portion 63. Also, in order to perform the processing of the even field image F0, an image extractor 64 and a character recognition portion 65 are substituted for the image storage 54 in the embodiment (1).

Furthermore, the image processor 60 has a result determining portion 66 for performing a result determination of the vehicle identification by the recognition result of the character recognition portions 63 and 65.

Figure 5:
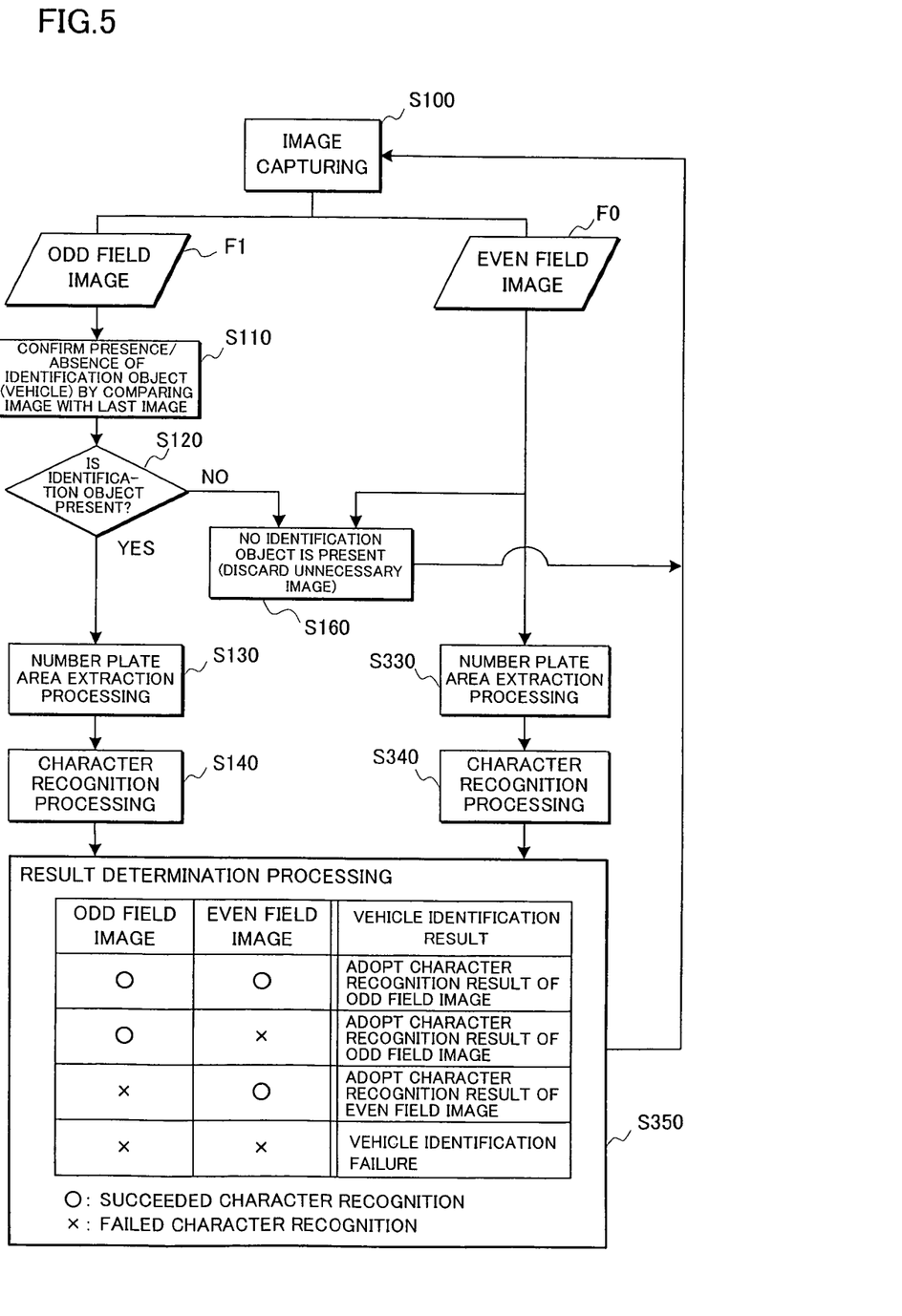
FIG. 5 is a flowchart showing a vehicle identification processing procedure in an embodiment (2)

FIG. 5 shows an image processing procedure of the odd field image F1 and the even field image F0 captured from the image-taking portion 20 in the embodiment (2).

It is to be noted that the capturing timings of the odd field image F1 and the even field image F0 are the same as the embodiment (1) described by referring to FIGS. 2A-2D.

At step S100 of FIG. 5, image capturing corresponding to step S10 of FIG. 4 is performed. When the captured image is the odd field image F1, the comparison portion 61 compares the image captured last time with the image captured this time and confirms whether or not the identification object vehicle exists at step S110, in the same way as the embodiment (1) shown in FIG. 3.

Namely, in the absence of the identification object at step S120, an unnecessary image is discarded because of absence of an identification object at step S160. At this time, an unnecessary image not only for the odd field image F1 but also the even field image F0 read at step S100 at the next timing are discarded.

Also, in the presence of the identification object at step S120, the image extractor 62 performs the number plate area extraction processing (at step S130), and the character recognition portion 63 performs the character recognition processing for the extracted number plate area (at step S140).

On the other hand, as for the even field image F0 read at the next timing at step S100, the image extractor 64 performs the number plate area extraction processing (at step S330), and the character recognition portion 65 performs the character recognition processing for the number plate area extracted (at step S340).

Thus, in the presence of the identification object at step S120, the character recognition result for the odd field image F1 is obtained by the character recognition portion 63 at step S140, and the character recognition result for the even field image F0 by the character recognition-portion 65 is obtained at step S340.

Accordingly, since two character recognition results are obtained, the result determining portion 66 determines the vehicle identification result at step S350. In this case, as shown in FIG. 5, there are four combinations of the results of the character recognition processing of the odd field image F1 and the even field image F0: a case where both character recognition processings are succeeded; a case where the character recognition processing only for the odd field image F1 is succeeded; a case where the character recognition processing only for the even field image F1 is succeeded; and a case where both processings end in failure.

Therefore, when the character recognition processing for the odd field image F1 is succeeded, the character recognition result of the odd field image F1 is adopted as a vehicle identification result regardless of the result of the character recognition processing of the even field image F0, and when the character recognition processing of the odd field image F1 ends in failure, the character recognition result of the even field image F0 is adopted.

On the other hand, when the character recognition processing for the even field image F0 is succeeded, the character recognition processing result of the even field image F0 is adopted as the vehicle identification result regardless of the result of the character recognition processing of the odd field image F1. When the character recognition processing of the even field image F0 ends in failure, the character recognition result of the odd field image F1 may be adopted.

As mentioned above, in the embodiment (1), the captured even field image F0 is held in the image storage 54, and the image is read only when it is necessary, and the extraction processing and the character recognition processing of the number plate area are performed. In the embodiment (2), the extraction processing and the character recognition processing of the number plate area of the odd field image F1, and the extraction processing and the character recognition processing of the number plate area of the even field image F0 are performed in parallel. Therefore, while the throughput, in the embodiment (2) is increased compared with the embodiment (1), the processing speed from capturing the image to obtaining the vehicle determination result is fast.

In the above-mentioned embodiments (1) and (2), the LED irradiation is made "ON" at the time of capturing the odd field image and it is made "OFF" at the time of capturing the even field image, as the LED irradiation timing described referring to FIGS. 2A-2D. However, not only "ON/OFF" control of the LED irradiation but also the light quantities of the LED irradiation in the odd field and in the even field may be made different from each other.

For example, as for the even field where the LED irradiation is made "OFF" in FIG. 2C, if the LED irradiation is made "ON" with 20% of the light quantity with which the irradiation is performed in the odd field, the image whose light quantity in the odd field is different from that in the even field can be also obtained.

Also, by performing the LED irradiation with the same light quantity in the odd field and the even field, and by changing the shutter speed at the time of capturing image, the images whose light quantities are different can be obtained in the odd field image F1 and the even field image F0.

Furthermore, it is needless to say that even if the odd field and the even field are exchanged, the completely same function/effect can be obtained.

As described above, the vehicle identification method and device according to the present invention are arranged so that an image frame of a vehicle is taken by an interlace method, irradiation is performed in an odd field and an even field composing the image frame with light of light quantities different from each other, images of the odd field and the even field are captured, and character recognition processing, only when character recognition processing of a number plate area extracted from an image of one field has ended in failure, of a number plate area extracted from an image of the other field is performed. Therefore, it becomes possible to improve an identification accuracy of a backlit number plate.

Also, character recognition processings of number plate areas extracted from the images of the odd field and the even field respectively are performed in parallel, and a result of character recognition processing, only when character recognition processing of a number plate area extracted from an image of one field has ended in failure, of a number plate area extracted from an image of the other field, is adopted as an identification result of the vehicle, thereby enabling an identification accuracy of a backlit number plate to be improved.

What is claimed is:

1. A vehicle identification method, comprising:
   taking an image frame of a vehicle by an interlace method;
   performing irradiation in an odd field and an even field, composing the image frame, with light of respective light quantities which are different from each other;
   capturing images of the odd field and the even field; and
   only when character recognition processing of a number plate area extracted from an image of one field of the even and odd fields has ended in failure, performing character recognition processing of a number plate area extracted from an image of the other field of the even and odd fields.

2. The vehicle identification method as claimed in claim 1, wherein at the step of performing the irradiation, the light quantity of the irradiation for either the odd field or the even field is null.

3. The vehicle identification method as claimed in claim 1, wherein the irradiation is performed in the odd field and the even field, not with the light of the respective light quantities different from each other but with light of a common light quantity, and at the step of capturing images, the images of the odd field and the even field are captured at respective shutter speeds different from each other.

4. A vehicle identification method, comprising:
   taking an image frame of a vehicle by an interlace method;
   performing irradiation in an odd field and an even field, composing the image frame, with light of respective light quantities which are different from each other;
   capturing images of the odd field and the even field;
   performing character recognition processings of number plate areas extracted from the images of the odd field and the even field, respectively, in parallel; and
   only when character recognition processing of a number plate area extracted from an image of one field of the even and odd fields has ended in failure, adopting a result of character recognition processing of a number plate area extracted from an image of the other field of the even and odd fields, as an identification result of the vehicle.

5. The vehicle identification method as claimed in claim 4, wherein at the step of performing the irradiation, the light quantity of the irradiation for either the odd field or the even field is null.

6. The vehicle identification method as claimed in claim 4, wherein the irradiation is performed in the odd field and the even field, not with the light of the respective light quantities different from each other but with light of a common light quantity, and at the step of capturing images, the images of the odd field and the even field are captured at respective shutter speeds different from each other.

7. A vehicle identification device, comprising:
   an image-taking portion taking an image frame of a vehicle by an interlace method;
   an irradiating portion performing irradiation in an odd field and an even field composing the image frame with light of respective light quantities different from each other; and
   an image processor operative, only when character recognition processing of a number plate area extracted from an image of one field of the even and odd fields has ended in failure, to capture images of the odd field and the even field and perform character recognition processing of a number plate area extracted from an image of the other field of the even and odd fields.

8. The vehicle identification device as claimed in claim 7, wherein the irradiating portion makes the light quantity of the irradiation for either the odd field or the even field is null.

9. The vehicle identification device as claimed in claim 7, wherein the irradiating portion performs the irradiation in the odd field and the even field, not with the light of the light quantities different from each other but with light of a common light quantity, and the image processor captures the images of the odd field and the even field at respective shutter speeds which are different from each other.

10. A vehicle identification device, comprising:
    an image-taking portion taking an image frame of a vehicle by an interlace method;
    an irradiating portion performing irradiation in an odd field and an even field composing the image frame with respective light of light quantities different from each other; and
    an image processor capturing images of the odd field and the even field and performing character recognition processings of number plate areas extracted from the images of the odd field and the even field respectively in parallel and only when character recognition processing of a number plate area extracted from an image of one field, of the odd and even fields, has ended in failure, adopting a result of character recognition processing of a number plate area extracted from an image of the other field, of the even and odd fields, as an identification result of the vehicle.

11. The vehicle identification device as claimed in claim 10, wherein the irradiating portion makes the light quantity of the irradiation for either the odd field or the even field is null.

12. The vehicle identification device as claimed in claim 10, wherein the irradiating portion performs the irradiation in the odd field and the even field, not with the light of the light quantities different from each other but with light of a common light quantity, and the image processor captures the images of the odd field and the even field at respective shutter speeds which are different from each other.

* * * * *